US007753663B2

(12) United States Patent  
Shimizu et al.

(10) Patent No.: US 7,753,663 B2
(45) Date of Patent: Jul. 13, 2010

(54) MOUNTING STRUCTURE OF DISCHARGE VALVE IN ROTARY COMPRESSOR

(75) Inventors: Takashi Shimizu, Sakai (JP); Yoshitaka Shibamoto, Sakai (JP); Kazuhiro Furusho, Sakai (JP); Kazutaka Hori, Sakai (JP); Takazo Sotojima, Sakai (JP); Masanori Masuda, Sakai (JP)

(73) Assignee: Daikin Industries, Ltd., Osaka (JP)

( * ) Notice: Subject to any disclaimer, the term of this patent is extended or adjusted under 35 U.S.C. 154(b) by 90 days.

(21) Appl. No.: 11/914,488

(22) PCT Filed: Apr. 25, 2006

(86) PCT No.: PCT/JP2006/308611

§ 371 (c)(1),
(2), (4) Date: Nov. 15, 2007

(87) PCT Pub. No.: WO2006/123519

PCT Pub. Date: Nov. 23, 2006

(65) Prior Publication Data

US 2009/0074600 A1    Mar. 19, 2009

(30) Foreign Application Priority Data

May 17, 2005    (JP)    ............................. 2005-143853

(51) Int. Cl.
*F03C 2/00*    (2006.01)
*F04C 18/00*    (2006.01)
*F04C 2/00*    (2006.01)

(52) U.S. Cl. ........................................ 418/59; 418/270
(58) Field of Classification Search ............. 418/57–59, 418/270
See application file for complete search history.

(56) References Cited

U.S. PATENT DOCUMENTS

| 1,229,676 | A  | * | 6/1917 | Tice .............................. 418/59 |
| 6,189,322 | B1 | * | 2/2001 | Ishihara et al. ................ 62/114 |
| 2006/0073052 | A1 | * | 4/2006 | Hwang et al. ................ 418/59 |

FOREIGN PATENT DOCUMENTS

| JP |   6100537 U | * | 1/1986 |
| JP | 62-157288 A |   | 7/1987 |
| JP | 05-223071 A |   | 8/1993 |
| JP | 06-159278 A |   | 6/1994 |
| JP | 06-288358 A |   | 10/1994 |
| JP |  06-80889 U |   | 11/1994 |
| JP | 2001-214873 A |   | 8/2001 |
| JP | 2002-039080 A |   | 2/2002 |
| JP | 2004-003507 A |   | 1/2004 |
| JP | 2004-300937 A |   | 10/2004 |
| JP | 2005320927 A | * | 11/2005 |

* cited by examiner

*Primary Examiner*—Theresa Trieu
(74) *Attorney, Agent, or Firm*—Global IP Counselors

(57) ABSTRACT

A bolt hole receiving a fixing bolt is formed in a portion of an end plate overlapping an annular piston or a fixed wrap as viewed in a thickness direction of the end plate to open at the back face of the end plate. In fixing a discharge valve to the end plate, the fixing bolt is screwed into the bolt hole.

8 Claims, 13 Drawing Sheets

MOUNTING STRUCTURE OF DISCHARGE VALVE IN ROTARY COMPRESSOR

CROSS-REFERENCE TO RELATED APPLICATIONS

This U.S. National stage application claims priority under 35 U.S.C. §119(a) to Japanese Patent Application No. 2005-143853, filed in Japan on May 17, 2005, the entire contents of which are hereby incorporated herein by reference.

TECHNICAL FIELD

This invention relates to rotary compressors in which a fluid is compressed in a compression chamber defined by a movable member and a fixed member.

BACKGROUND ART

Rotary compressors are conventionally known which include a movable member capable of eccentric motion and a fixed member defining a compression chamber together with the movable member and in which a fluid is sucked and compressed in the compression chamber by driving the movable member. In a rotary compressor of such kind, a discharge valve for opening and closing a discharge passage communicated with the compression chamber is formed, for example, of a reed valve (see, for example, Published Japanese Patent Application No. 2002-39080).

FIG. 1 in Published Japanese Patent Application No. 2002-39080 shows a scroll type rotary compressor which includes a fixed scroll and a movable scroll and in which a fixed wrap of the fixed scroll and a movable wrap of the movable scroll engage with each other to form a compression chamber. The fixed scroll has a discharge passage formed in the center of an end plate thereof. A discharge valve formed of a reed valve for opening and closing the discharge passage is mounted to the back face of the end plate. In this rotary compressor, the discharge passage becomes a dead volume in which remains part of the fluid having not been discharged in a previous compression process. Therefore, in order to shorten the length of the discharge passage, it is desirable to minimize the thickness of the end plate so long as a necessary rigidity thereof can be secured. However, doing so may incur shortage of the length of engagement between the external thread of a bolt and the internal thread of a bolt hole. In this rotary compressor, to avoid the shortage of the engagement length, a raised part is formed on the front face of the end plate and the bolt hole is formed at a portion of the end plate corresponding to the raised part. The raised part is formed on the end plate towards the peripheral edge thereof so that it may not interfere with the movable scroll.

SUMMARY OF THE INVENTION

Problems to be Solved by the Invention

As described above, when the end plate in the conventional rotary compressor is formed with a small thickness to lessen the dead volume, in order to avoid shortage of the length of engagement between the external thread of the fastening element and the internal thread of the fitting hole, it is necessary to provide a raised part on the front face of the end plate and thereby thicken the portion of the end plate corresponding to the fitting hole. This involves the trouble of forming the raised part in the course of working the end plate. Furthermore, since the raised part is formed at the portion of the end plate towards the peripheral edge thereof to avoid interference with the movable plate and the fitting hole is accordingly located at the portion of the end plate towards the peripheral edge thereof, this inevitably increases the length of the discharge valve. Therefore, the discharge valve has a relatively large thickness and width in order to secure its rigidity.

The present invention has been made in view of the foregoing points and, therefore, an object of the present invention is to provide a rotary compressor in which a discharge valve is fixed to the back face of an end plate and which can reduce the labor of working the end plate and downsize the discharge valve.

Means to Solve the Problems

A first aspect of the invention is directed to a rotary compressor including: a cylinder (40) having an annular cylinder chamber (41, 42); an annular piston (45) contained in the cylinder chamber (41, 42) eccentrically with respect to the cylinder (40) to divide the cylinder chamber (41, 42) into an outer cylinder chamber (41) and an inner cylinder chamber (42); a blade (46) disposed in the cylinder chamber (41, 42) to divide each of the outer and inner cylinder chambers (41, 42) into a first chamber (41a, 42a) and a second chamber (41b, 42b); and an end plate (37) joined at the front face thereof to the root end of the annular piston (45) and facing the cylinder chamber (41, 42), the rotary compressor being configured to compress a fluid in the cylinder chamber (41, 42) by rotating the cylinder (40) and the annular piston (45) eccentrically relative to each other. Furthermore, the end plate (37) is provided with a discharge passage (51, 52) communicated with the cylinder chamber (41, 42) and opening at the back face of the end plate (37) and a discharge valve (21) for opening and closing the discharge passage (51, 52), the discharge valve (21) is fixed to the end plate (37) by a fastening element (22), and a fitting hole (26) receiving the fastening element (22) is formed in a portion of the end plate (37) overlapping the annular piston (45) as viewed in a thickness direction of the end plate (37) and opens at the back face of the end plate (37).

In a second aspect of the invention, related to the first aspect of the invention, the end plate (37) has a recess (25) formed in the back face thereof and the discharge passage (51, 52) and the fitting hole (26) open at the bottom of the recess (25).

In a third aspect of the invention, related to the second aspect of the invention, the recess (25) is formed from radially inwardly to outwardly of the annular piston (45) as viewed in the thickness direction of the end plate (37) and extends along a tangential direction of the annular piston (45).

In a fourth aspect of the invention, related to any one of the first to third aspects of the invention, the fitting hole (26) is formed through the end plate (37) to the annular piston (45).

A fifth aspect of the invention is directed to a scroll type compressor which includes a fixed scroll (39) and a movable scroll (38) and in which a fixed wrap (49) of the fixed scroll (39) and a movable wrap (48) of the movable scroll (38) engage with each other to form a compression chamber (41). Furthermore, the fixed scroll (39) includes an end plate (37) on the front face of which the fixed wrap (49) stands and which faces the compression chamber (41), the end plate (37) is provided with a discharge passage (51, 52) communicated with the compression chamber (41) and opening at the back face of the end plate (37) and a discharge valve (21) for opening and closing the discharge passage (51, 52), the discharge valve (21) is fixed to the end plate (37) by a fastening element (22), and a fitting hole (26) receiving the fastening element (22) is formed in a portion of the end plate (37)

overlapping the fixed wrap (49) as viewed in a thickness direction of the end plate (37) and opens at the back face of the end plate (37).

In a sixth aspect of the invention, related to the fifth aspect of the invention, the fitting hole (26) is formed through the end plate (37) to the fixed wrap (49).

In a seventh aspect of the invention, related to the sixth aspect of the invention, the fixed wrap (49) has varying thicknesses and the fitting hole (26) is formed in a thick portion of the fixed wrap (49).

In an eighth aspect of the invention, related to any one of the first to seventh aspects of the invention, the discharge valve (21) is formed of a reed valve including a plate-shaped valve element (18) abutting at the front face thereof on the back face of the end plate (37) and a valve stop (16) for limiting the amount of deformation of the valve element (18), and the fastening element (22) passes through the root end of the valve stop (16).

In a ninth aspect of the invention, related to the eighth aspect of the invention, the discharge passage (51, 52) is formed in the cross section of a slit extending in a longitudinal direction of the valve element (18).

In a tenth aspect of the invention, related to any one of the first to ninth aspects of the invention, the rotary compressor is disposed in a refrigerant circuit of a refrigeration system for operating in a refrigeration cycle and configured to compress carbon dioxide serving as refrigerant with which the refrigerant circuit is filled.

Work or Operation

In the first aspect, the fitting hole (26) receiving the fastening element (22) is formed in a portion of the end plate (37) overlapping the annular piston (45) as viewed in a thickness direction of the end plate (37) and opens at the back face of the end plate (37). The portion of the end plate (37) overlapping the annular piston (45), in which the fitting hole (26) is formed, is increased in thickness by the height of the annular piston (45). In conventional techniques, a raised part is formed at a portion of the end plate (37) corresponding to the fitting hole (26) in order to avoid shortage of the length of screw engagement between the external thread of the fastening element (22) and the internal thread of the fitting hole (26). In contrast, according to the first aspect, in forming the fitting hole (26), the thick portion of the end plate (37) overlapping the annular piston (45) is used in order to avoid shortage of the length of screw engagement between the external thread of the fastening element (22) and the internal thread of the fitting hole (26). This eliminates the need to provide a raised part for forming the fitting hole (26).

In the second aspect, in order to lessen the dead volume, the discharge passage (51, 52) opens at the bottom of the recess (25) which forms a portion of the end plate (37) having a small thickness. In addition, the fitting hole (26) also opens at the bottom of the recess (25). If, in this configuration, a raised part were provided to avoid shortage of the length of screw engagement between the external thread of the fastening element (22) and the internal thread of the fitting hole (26), not only the raised part but also the fitting hole (26) would be located towards the peripheral edge of the end plate (37) and, therefore, the recess (25) should be formed from the vicinity of the discharge passage (51, 52) to the vicinity of the peripheral edge of the end plate (37). In contrast, according to the second aspect, since the fitting hole (26) is formed in the portion of the end plate (37) overlapping the annular piston (45), the fitting hole (26) is located close to the discharge passage (51, 52).

In the third aspect, the recess (25) is formed from radially inwardly to outwardly of the annular piston (45) and extends along a tangential direction of the annular piston (45). In other words, the recess (25) is formed along the annular piston (45) to have a large area overlapping the annular piston (45) as viewed in the thickness direction of the end plate (37).

In the fourth aspect, the fitting hole (26) is formed through the end plate (37) to reach the annular piston (45) joined to the back side of the end plate (37). In other words, the inside of the annular piston (45) is used to form the fitting hole (26).

In the fifth aspect, a fitting hole (26) receiving the fastening element (22) is formed in a portion of the end plate (37) overlapping the fixed wrap (49) as viewed in a thickness direction of the end plate (37) and opens at the back face of the end plate (37). The portion of the end plate (37) overlapping the fixed wrap (49), in which the fitting hole (26) is formed, is increased in thickness by the height of the fixed wrap (49). In other words, according to the fifth aspect, in forming the fitting hole (26), the thick portion of the end plate (37) overlapping the fixed wrap (49) is used in order to avoid shortage of the length of screw engagement between the external thread of the fastening element (22) and the internal thread of the fitting hole (26). This eliminates the need to provide a raised part for forming the fitting hole (26).

In the sixth aspect, the fitting hole (26) is formed through the end plate (37) to reach the fixed wrap (49) joined to the back side of the end plate (37). In other words, the inside of the fixed wrap (49) is used to form the fitting hole (26).

In the seventh aspect, the portion of the fixed wrap (49) in which the fitting hole (26) is formed has a large thickness. Thus, the strength of a portion of the fixed wrap (49) surrounding the fitting hole (26) can be increased.

In the eighth aspect, the discharge valve (21) is fixed to the end plate (37) by the fastening element (22) passing through the root end of the valve stop (16). In the discharge valve (21), the valve element (18) opens or closes the discharge passage (51, 52) according to its deformation and the valve stop (16) limits the amount of deformation of the valve element (18).

In the ninth aspect, the discharge passage (51, 52) is formed in the cross section of a slit extending in a longitudinal direction of the valve element (18). This enables the necessary width of the valve element (18) to be reduced.

In the tenth aspect, the rotary compressor (10) is configured to compress carbon dioxide in the cylinder chamber (41, 42) or the compression chamber (41). A refrigeration cycle using carbon dioxide as refrigerant provides a large pressure difference between low-pressure refrigerant to be sucked into the cylinder chamber (41, 42) or the compression chamber (41) and high-pressure refrigerant to be discharged from the cylinder chamber (41, 42) or the compression chamber (41). Therefore, in order to withstand the pressure difference between low-pressure refrigerant and high-pressure refrigerant during compression, the fixed wrap (49) or the annular piston (45) defining the cylinder chamber (41, 42) or the compression chamber (41) has a larger thickness than in compressors using common chlorofluorocarbon refrigerants. Hence, the portion of the end plate (37) overlapping the annular piston (45) or the portion of the end plate (37) overlapping the fixed wrap (45), in which the fitting hole (26) is formed, has a large width.

Effects of the Invention

According to the present invention, in forming the fitting hole (26), the thick portion of the end plate (37) overlapping the annular piston (45) or the fixed wrap (49) as viewed in the thickness direction of the end plate (37) is used to eliminate the need to provide a raised part for forming the fitting hole (26). Therefore, the labor of working the end plate (37) can be reduced. Furthermore, where the fitting hole (26) is formed in the portion of the end plate (37) overlapping the annular piston (45) or the fixed wrap (49), the fitting hole (26) is closer to the discharge passage (51, 52) than according to the conventional technique in which the raised part is provided. Therefore, the length of the discharge valve (21) becomes shorter than according to the conventional technique in which the raised part is provided. This reduces the necessary rigidity of the discharge valve (21) and thereby reduces the thickness and width thereof. As a result, the discharge valve (21) can be downsized.

Furthermore, in the second aspect, the recess (25) is provided in the end plate (37) in order to lessen the dead volume. In addition, the fitting hole (26) is formed in the portion of the end plate (37) overlapping the annular piston (45). Therefore, the fitting hole (26) is closer to the discharge passages (51, 52) than according to the conventional technique in which the fitting hole (26) is formed in the raised part. Thus, the area of the recess (25) can be reduced as compared with the conventional technique. This reduces the deformation of the end plate (37) produced in the process of fluid compression in the cylinder chamber (41, 42), which reduces leakage of refrigerant from the cylinder chamber (41, 42) accompanying the deformation of the end plate (37) and in turn enhances the compression efficiency of the rotary compressor (10).

Furthermore, in the third aspect, the recess (25) is formed along the annular piston (45) to have a large area overlapping the annular piston (45) as viewed in the thickness direction of the end plate (37). The bottom wall of the recess (25) has a generally smaller thickness than its surrounding portion but a portion of the bottom wall of the recess (25) overlapping the annular piston (45) is increased in thickness by the height of the annular piston (45). In other words, the recess (25) is formed along the annular piston (45) to reduce the area of the thin portion of the bottom wall of the recess (25). This reduces the deformation of the end plate (37) produced in the process of fluid compression in the cylinder chamber (41, 42), which reduces leakage of refrigerant from the cylinder chamber (41, 42) accompanying the deformation of the end plate (37) and in turn enhances the compression efficiency of the rotary compressor (10).

Furthermore, according to the fourth aspect, the fitting hole (26) is formed to reach the annular piston (45) by use of the inside of the annular piston (45). This ensures a sufficient length of screw engagement between the external thread of the fastening element (22) and the internal thread of the fitting hole (26), whereby the discharge valve (21) can be further firmly fixed to the end plate (37).

Furthermore, according to the sixth aspect, the fitting hole (26) is formed to reach the fixed wrap (49) by use of the inside of the fixed wrap (49). This ensures a sufficient length of screw engagement between the external thread of the fastening element (22) and the internal thread of the fitting hole (26), whereby the discharge valve (21) can be further firmly fixed to the end plate (37).

Furthermore, according to the seventh aspect, the portion of the fixed wrap (49) in which the fitting hole (26) is formed has a large thickness and, therefore, the strength of the portion thereof surrounding the fitting hole (26) can be increased. This prevents breakage of the portion of the fixed wrap (49) surrounding the fitting hole (26). Alternatively, the thickness of the fastening element (22) can be increased. In the latter case, the fastening element (22) can be prevented from breakage.

Furthermore, in the ninth aspect, the discharge passages (51, 52) is formed in the cross section of a slit extending in a longitudinal direction of the valve element (18) to reduce the necessary width of the valve element (18). Therefore, the discharge valve (21) can be downsized. Furthermore, in the rotary compressor (10) in which the recess (25) is formed in the end plate (37), since the necessary width of the valve element (18) is reduced, the necessary width of the recess (25) can be reduced. Therefore, the area of the recess (25) can be further reduced, which further reduces the deformation of the end plate (37) produced in the process of fluid compression in the cylinder chamber (41, 42). This reduces leakage of refrigerant from the cylinder chamber (41, 42) accompanying the deformation of the lower housing (37) and in turn further enhances the compression efficiency of the rotary compressor (10).

Furthermore, according to the tenth aspect, the portion of the end plate (37) overlapping the annular piston (45) or the portion of the end plate (37) overlapping the fixed wrap (49), which is the portion thereof where the fitting hole (26) is to be formed, has a large width. Therefore, the space for forming the fitting hole (26) can be easily secured. Furthermore, since the strength of the portion of the end plate (37) surrounding the fitting hole (26) can be increased, this prevents breakage of that portion. Alternatively, the thickness of the fastening element (22) can be increased. In the latter case, the fastening element (22) can be prevented from breakage.

DETAILED DESCRIPTION OF THE INVENTION

Hereinafter, embodiments of the invention will be described with reference to the drawings.

Embodiment 1 of the Invention

Figure 1:
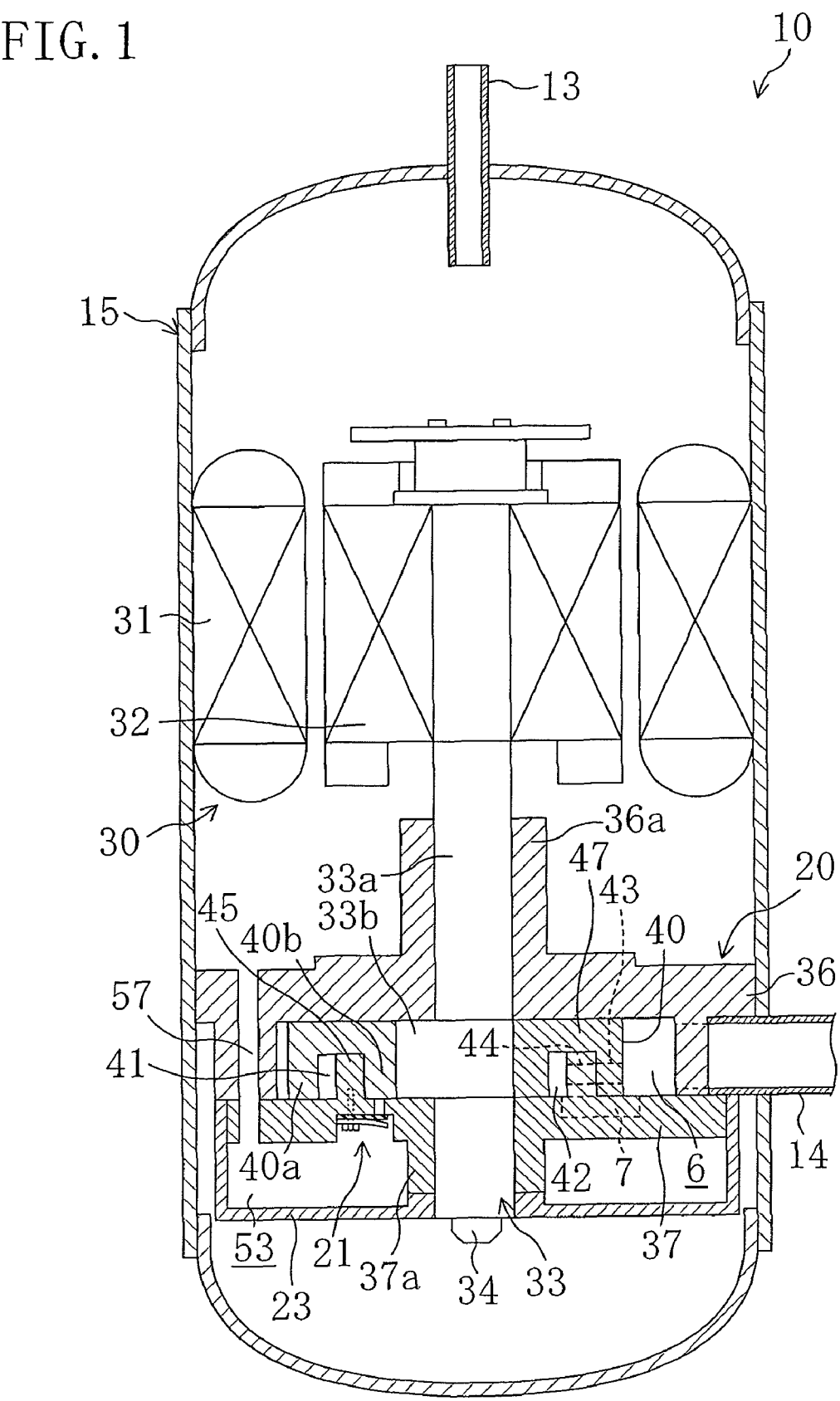
FIG. 1 is a longitudinal cross-sectional view of a rotary compressor according to Embodiment 1.

A description is given of Embodiment 1 of the invention. FIG. 1 shows a longitudinal cross-sectional view of a compressor (10) according to Embodiment 1. The compressor (10) is a rotary compressor (10) which compresses refrigerant in a cylinder chamber (41, 42) by rotating an annular piston (45) and a cylinder (40) both described later eccentrically relative to each other. The rotary compressor (10) is disposed in a refrigerant circuit of a refrigeration system which is filled with carbon dioxide as the refrigerant and operates in a vapor compression refrigeration cycle. The rotary compressor (10) compresses the refrigerant sucked therein from an evaporator and then discharges it to a condenser. In this refrigerant circuit, the high-side pressure of the refrigeration cycle becomes higher than the critical pressure of carbon dioxide.

The compressor (10) includes a casing (15) that is a vertically elongated, cylindrical, closed enclosure. The casing (15) contains a compression mechanism (20) disposed in a lower part thereof and an electric motor (30) disposed in an upper part thereof.

The casing (15) is provided with a suction pipe (14) passing through the shell thereof. The suction pipe (14) is connected to the compression mechanism (20). The casing (15) is provided also with a discharge pipe (13) passing through the top thereof. The discharge pipe (13) has an inlet opening into a space of the casing (15) located above the electric motor (30).

The casing (15) is internally provided with a vertically extending crankshaft (33). The crankshaft (33) includes a main spindle (33a) and an eccentric part (33b). The eccentric part (33b) is provided in a lower portion of the crankshaft (33) and formed in a columnar shape having a larger diameter than the main spindle (33a). The axis of the eccentric part (33b) is eccentric a specified distance away from the axis of the main spindle (33a).

Figure 2:
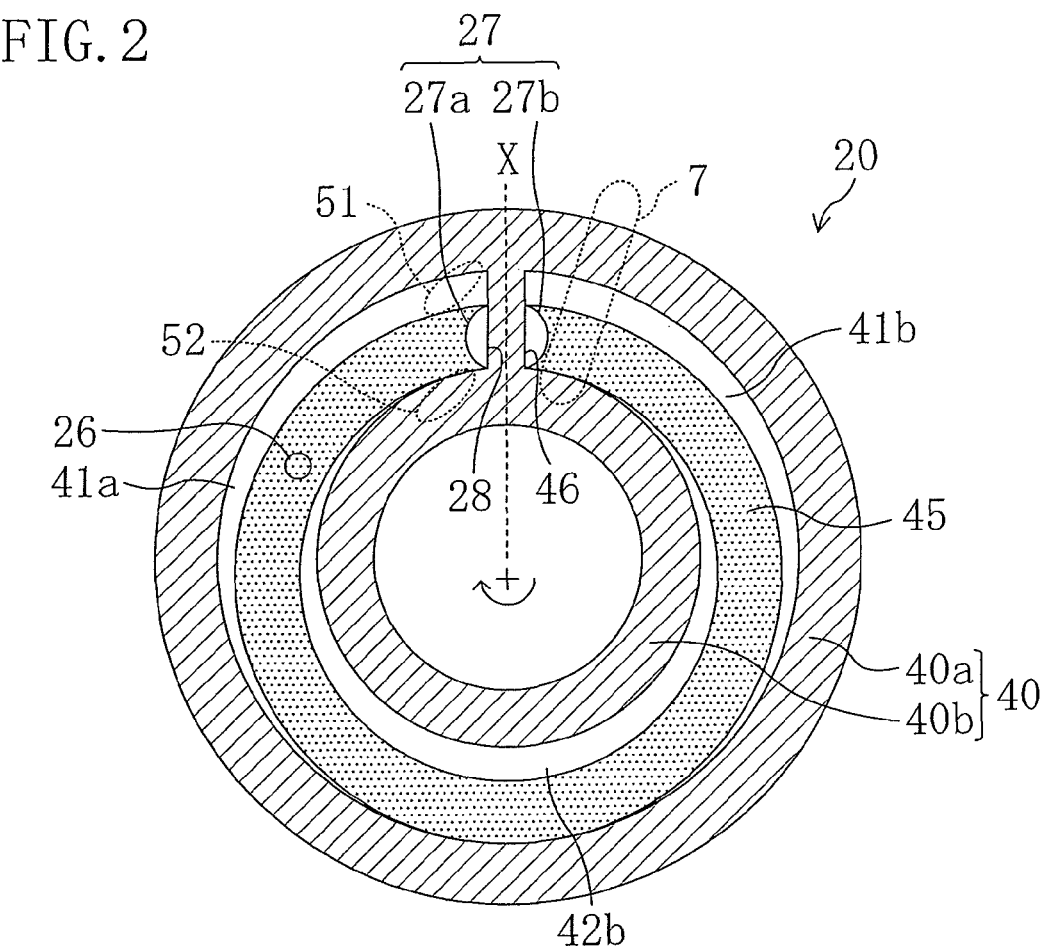
FIG. 2 is a transverse cross-sectional view of a compression mechanism in the rotary compressor according to Embodiment 1.

The compression mechanism (20) is constructed between an upper housing (36) fixed to the casing (15) and a lower housing (37) that is an end plate. As shown in FIG. 2, the compression mechanism (20) includes the cylinder (40), the annular piston (45), a blade (46) and a swing bush (27). The root end (lower end) of the annular piston (45) is joined to the front face (top face) of the lower housing (37) (see FIG. 1).

The cylinder (40) comprises an outer cylinder (40a) and an inner cylinder (40b). The outer cylinder (40a) and the inner cylinder (40b) are formed integral so that their upper ends are joined by a connecting member (47) (see FIG. 1). The connecting member (47) is formed to one end of (above) the annular piston (45) and faces a cylinder chamber (41, 42) described later.

The outer cylinder (40a) and the inner cylinder (40b) are both annularly formed. The inner periphery of the outer cylinder (40a) and the outer periphery of the inner cylinder (40b) are concentrically arranged cylindrical surfaces. Therefore, an annular cylinder chamber (41, 42) is defined between the inner periphery of the outer cylinder (40a) and the outer periphery of the inner cylinder (40b).

The eccentric part (33b) of the crankshaft (33) is slidably fitted in the inner periphery of the inner cylinder (40b). The rotary compressor (10) according to this embodiment is configured so that the annular piston (45) is fixed, the cylinder (40) rotates eccentrically with respect to the annular piston (45) and the annular piston (45) and the cylinder (40) thereby rotate relative to each other.

The annular piston (45) is formed in the shape of the letter C obtained by cutting away part of a ring. The annular piston (45) is formed so that its outer periphery has a smaller diameter than the inner periphery of the outer cylinder (40a) and its inner periphery has a larger diameter than the outer periphery of the inner cylinder (40b). The annular piston (45) is contained in the cylinder chamber (41, 42) eccentrically with respect to the cylinder (40). Thus, the annular piston (45) divides the cylinder chamber (41, 42) into inner and outer parts. Specifically, an outer cylinder chamber (41) is defined between the outer periphery of the annular piston (45) and the inner periphery of the outer cylinder (40a), and an inner cylinder chamber (42) is defined between the inner periphery of the annular piston (45) and the outer periphery of the inner cylinder (40b). Note that since the rotary compressor (10) according to Embodiment 1 is provided in the refrigerant circuit in which carbon dioxide is used as the refrigerant, the annular piston (45) has a larger thickness than in compressors using common chlorofluorocarbon refrigerants, in order to withstand the pressure difference between low-pressure refrigerant and high-pressure refrigerant during compression.

The annular piston (45) and the cylinder (40) are in such a relative position that the outer periphery of the annular piston (45) and the inner periphery of the outer cylinder (40a) come into substantially a single point contact with each other (strictly, a micron-order clearance is left between them but refrigerant leakage through the clearance is insignificant), while the inner periphery of the annular piston (45) and the outer periphery of the cylinder (40) come into substantially a single point contact with each other at a point shifted 180° in phase with respect to the other contact point.

The blade (46) is configured to pass through the cutaway of the annular piston (45) and extend in a radial direction of the cylinder chamber (41, 42) from the inner periphery of the outer cylinder (40a) to the outer periphery of the inner cylinder (40b). The blade (46) is fixed to the inner periphery of the outer cylinder (40a) and the outer periphery of the inner cylinder (40b). Thus, the blade (46) divides each of the outer and inner cylinder chambers (41, 42) into a high-pressure chamber (compression chamber) (41a, 42a) as a first chamber and a low-pressure chamber (suction chamber) (41b, 42b) as a second chamber.

The swing bush (27) connects, at the cutaway of the annular piston (45) (the opening of a C-shape obtained by cutting away part of a ring), the annular piston (45) and the blade (46) for relative movement between them. The swing bush (27) is composed of a discharge-side bush (27a) located towards the high-pressure chamber (41a, 42a) with respect to the blade (46) and a suction-side bush (27b) located towards the low-pressure chamber (41b, 42b) with respect to the blade (46). The discharge-side bush (27a) and the suction-side bush (27b) are formed in the same shape of an approximately semi-circular cross section and disposed to face each other with their respective flat faces. The space between the facing flat faces of both the bushes (27a, 27b) constitutes a blade groove (28).

The blade groove (28) receives the blade (46). The flat faces of the swing bushes (27a, 27b) (both the side faces of the blade groove (28)) come into substantially face-to-face contact with the blade (46). The arcuate outer peripheries of the swing bushes (27a, 27b) come into substantially face-to-face contact with the annular piston (45). The swing bushes (27a, 27b) are configured so that with the blade (46) wedged in the blade groove (28), the blade (46) moves back and forth in the blade groove (28) in the direction along its surfaces. The swing bushes (27a, 27b) are also configured to oscillate unitarily with the blade (46) with respect to the annular piston (45). Therefore, the swing bushes (27a, 27b) are configured for relative oscillation of the blade (46) and the annular piston (45) about the center of the swing bush (27) and for forward and backward movement of the blade (46) in the direction along the surfaces of the blade (46) with respect to the annular piston (45).

Although in Embodiment 1 the description is given of an example in which both the bushes (27a, 27b) are separate from each other, both the bushes (27a, 27b) may be of an integral structure in which they are partly joined to each other.

The upper housing (36) and the lower housing (37) are formed with their respective bearings (36a, 37a) that are sliding bearings. The crankshaft (33) is rotatably supported to the bearings (36a, 37a). In the rotary compressor (10) according to Embodiment 1, the crankshaft (33) vertically passes through the compression mechanism (20). The crankshaft (33) is held through the upper housing (36) and the lower housing (37) to the casing (15).

The lower housing (37) is formed to one end of (below) the cylinder (40) and its front face (top face) faces the cylinder chamber (41, 42). Furthermore, a muffler (23) is attached to the underside of the lower housing (37). A discharge space (53) is defined between the lower housing (37) and the muffler (23). Furthermore, a communication passage (57) communicating the discharge passage (53) with the space above the compression chamber (20) is formed in peripheral portions of the upper housing (36) and the lower housing (37).

The electric motor (30) includes a stator (31) and a rotor (32). The stator (31) is fixed to the interior wall of the shell of the casing (15). The rotor (32) is placed inside the stator (31) and coupled to the main spindle (33a) of the crankshaft (33). The crankshaft (33) is configured to rotate together with the rotor (32).

The crankshaft (33) is provided at the lower end with an oil pump (34). The oil pump (34) is connected to an oil feeding channel (not shown) extending along the axis of the crankshaft (33) and communicated with the compression mechanism (20). The oil pump (34) is configured to feed lubricating oil reserved in the bottom part of the interior of the casing (15) through the oil feeding channel to sliding parts of the compression mechanism (20).

With the above configuration, when the crankshaft (33) rotates, the outer cylinder (40a) and the inner cylinder (40b) oscillate about the central point of the swing bush (27) while moving back and forth along the blade groove (28) (in a radial direction of the cylinder chamber (41, 42). By the oscillating motion, the cylinder (40) rotates (moves orbitally) while moving eccentrically with respect to the center of the crankshaft (33) (see FIGS. 5A to 5D).

A suction space (6) is formed outside the outer cylinder (40a) (see FIG. 1). The outlet of the suction pipe (14) passing through the shell of the casing (15) opens into the suction space (6). Furthermore, the lower housing (37) is formed with a suction passage (7) extending in a radial direction of the cylinder (40). The suction passage (7) is formed into a long channel to extend from the inner cylinder chamber (42) to the suction space (6). The suction passage (7) communicates the low-pressure chamber (41b, 42b) of the cylinder chamber (41, 42) with the suction space (6). Furthermore, the outer cylinder (40a) is formed with a through hole (43) communicating the suction space (6) with the low-pressure chamber (41b) of the outer cylinder (41). The annular piston (45) is formed with a through hole (44) communicating the low-pressure chamber (41b) of the outer cylinder chamber (41) with the low-pressure chamber (42b) of the inner cylinder chamber (42).

Figure 3:
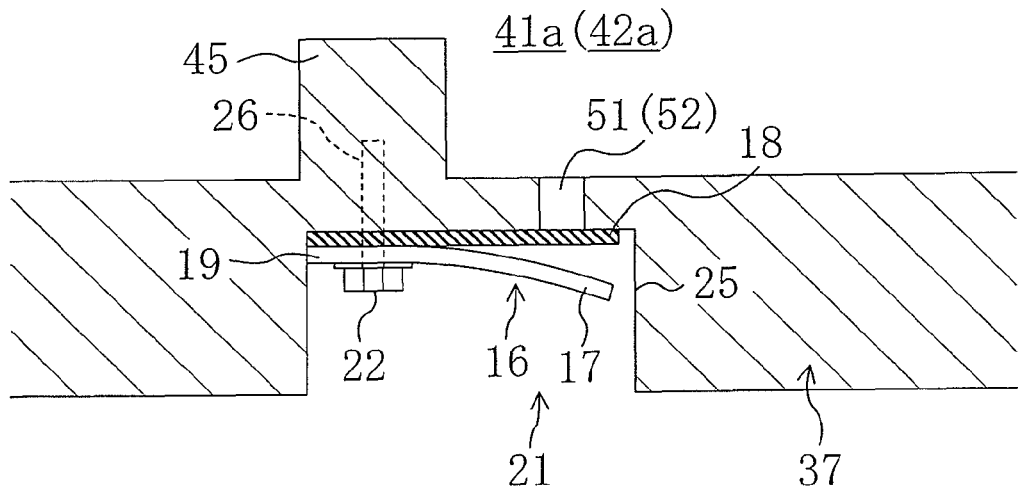
FIG. 3 is a cross-sectional view of a discharge valve in the rotary compressor according to Embodiment 1.
Figure 4:
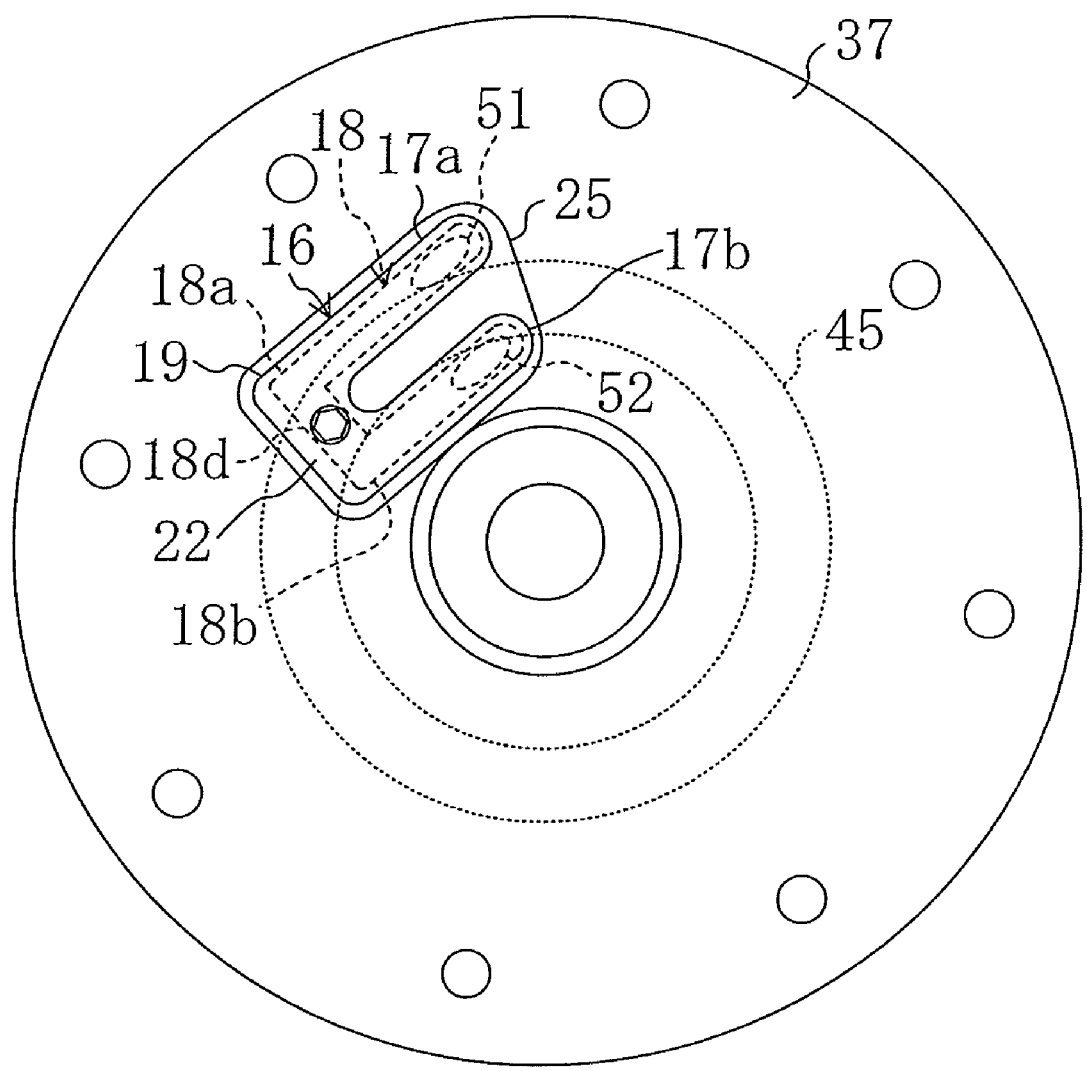
FIG. 4 is a plan view of a lower housing in the rotary compressor according to Embodiment 1.

As shown in FIG. 3, a recess (25) is formed in the back face (bottom face) of the lower housing (37). As shown in FIG. 4, the recess (25) is formed in a substantially rectangular shape. The recess (25), as viewed in the direction of thickness of the lower housing (37), is formed from radially inwardly to outwardly of the annular piston (45) joined to the front face of the lower housing (37) and extends along a tangential direction of the annular piston (45). In other words, the recess (25) is formed in a region of the lower housing (37) across the annular piston (45) and its longitudinal direction approximately coincides with a tangential direction of the annular piston (45). The portion of the lower housing (37) forming the bottom wall of the recess (25) has a smaller thickness than its surrounding portions, but its part overlapping the annular piston (45) is increased in thickness by the height of the annular piston (45). Thus, the area of the thin portion of the bottom wall of the recess (25) is reduced.

The lower housing (37) is further formed with an outer discharge passage (51) and an inner discharge passage (52) both communicated with the cylinder chamber (41, 42) and opening at the bottom of the recess (25). The outer discharge passage (51) and the inner discharge passage (52) are each formed in the cross section of a slit extending in the longitudinal direction of the recess (25) and juxtaposed to one longitudinal end of the recess (25) (to the upper right side of the recess (25) in FIG. 4) and substantially in a radial direction of the lower housing (37). The inlet of the outer discharge passage (51) opens into the high-pressure chamber (41a) of the outer cylinder chamber (41), while the inlet of the inner discharge passage (52) opens into the high-pressure chamber (42a) of the inner cylinder chamber (42). Both the discharge passages (51, 52) communicate the associated high-pressure chambers (41a, 42a) of the cylinder chamber (41, 42) with the discharge space (53).

Provided in the recess (25) are a first valve element (18a) and a second valve element (18b) each having an elongated plate shape. The first valve element (18a) and the second valve element (18b) are joined at their root ends by a connecting part (18d). The first valve element (18a) and the second valve element (18b) are placed so that their longitudinal directions coincide with the longitudinal direction of the recess (25) and their front faces abut on the bottom of the recess (25). The longitudinal directions of the valve elements (18a, 18b) coincide also with the longitudinal direction of the discharge passages (51, 52) of slit cross section. Each valve element (18a, 18b) has a slightly longer width than the short axis of the outlet opening of the associated discharge passage (51, 52). The first valve element (18a) is placed so that its front face abuts at its distal end on a portion of the recess bottom surrounding the outlet of the outer discharge passage (51) and providing a valve seat surface for it. The second valve element (18b) is placed so that its front face abuts at its distal end on a portion of the recess bottom surrounding the outlet of the inner discharge passage (52) and providing a valve seat surface for it. Note that the first valve element (18a) and the second valve element (18b) may be separate from each other without being joined by the connecting part (18d).

The lower housing (37) is provided with a plate-shaped valve stop (16) composed of a fixed part (19), a first main part (17a) and a second main part (17b). The valve stop (16) is formed so that the two main parts (17a, 17b) extend in the same direction from one side of the fixed part (19) in spaced relation to each other, and has the shape of an U in plan view. The valve stop (16) and the valve element (18) constitute a discharge valve (21) of the invention. The discharge valve (21) is a reed valve and is configured so that the valve element (18) elastically deforms to open or close the discharge passages (51, 52).

The valve stop (16) is placed so that the first main part (17a) underlies the first valve element (18a) and the second main part (17b) underlies the second valve element (18b). The fixed part (19) of the valve stop (16) abuts on the back faces of the root ends of both the valve elements (18a, 18b). The main part (17) has a downwardly bowed arcuate shape so that its top face comes farther away from both the valve elements (18a, 18b) with approach towards its distal end. The first main part (17a) limits the amount of deformation of the first valve element (18a), and the second main part (17b) limits the amount of deformation of the second valve element (18b).

A bolt hole (26) serving as a fitting hole is formed, at the other longitudinal end of the recess (25) (to the lower left side of the recess (25) in FIG. 4) and at a point overlapping the annular piston (45) as viewed in the thickness direction of the lower housing (37), to extend from the bottom of the recess (25) to the annular piston (45). The bolt hole (26) passes through the bottom wall of the recess (25) and reaches the annular piston (45) joined to the other side of the bottom wall. Furthermore, the connecting part (18d) and the fixed part (19) of the valve stop (16) are formed with their respective through holes. A fixing bolt (22) serving as a fastening element is inserted into the through holes and screwed in the bolt hole (26). Thus, the valve element (18) and the valve stop (16) are mounted to the recess (25). The root ends of both the valve elements (18a, 18b) are gripped between the fixed part (19) and the bottom of the recess (25). Although the bolt hole (26) is formed to reach the annular piston (45), which provides firm fixing of the discharge valve (21) to the lower housing (37), it may be formed within the thickness of the bottom wall of the recess (25) without passing through the bottom wall.

Operational Behavior

Figure 5:
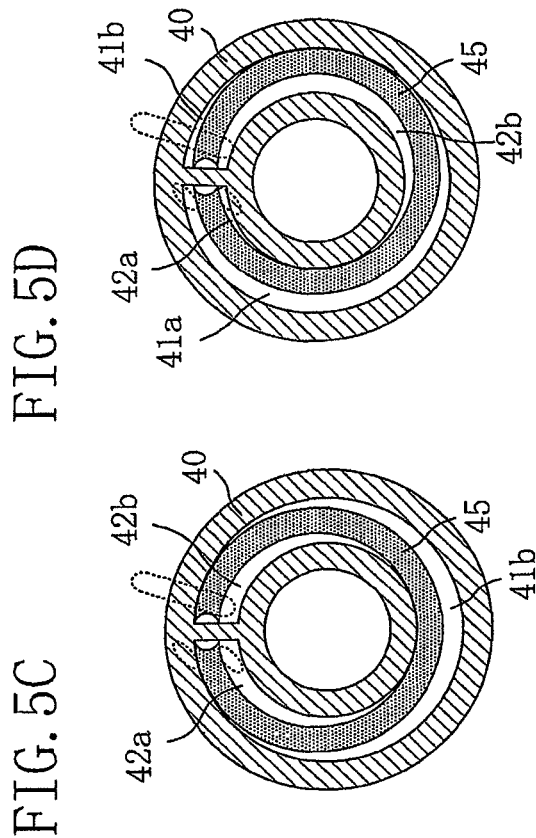
FIGS. 5A-5D show transverse cross-sectional views illustrating the behavior of the compression mechanism in the rotary compressor according to Embodiment 1.

Next, a description is given of the operational behavior of the rotary compressor (10) with reference to FIG. 5.

When the electric motor (30) is started up, the rotation of the rotor (32) is transmitted through the crankshaft (33) to the outer cylinder (40a) and inner cylinder (40b) of the compression mechanism (20). As a result, the blade (46) reciprocates (moves back and forth) in the swing bush (27a, 27b) and the blade (46) and the swing bush (27a, 27b) unitarily oscillate with respect to the annular piston (45). Furthermore, the outer cylinder (40a) and the inner cylinder (40b) oscillate and move orbitally with respect to the annular piston (45), whereby the compression mechanism (20) performs a specified compressing work.

In the outer cylinder chamber (41) during the course of the compressing work, when the cylinder (40) moves orbitally clockwise in the figure from the position shown in FIG. 5D (the position where the volume of the low-pressure chamber (41b) is substantially at its minimum), carbon dioxide is sucked as refrigerant through the suction passage (7) into the low-pressure chamber (41b). Concurrently, refrigerant is sucked from the suction space (6) through the through hole (43) into the low-pressure chamber (41b). Then, when the cylinder (40) further moves orbitally in order of FIGS. 5A, 5B and 5C and comes again to the position in FIG. 5D, a suction of refrigerant into the low-pressure chamber (41b) is completed.

At the completion of this suction of refrigerant, the low-pressure chamber (41b) becomes a high-pressure chamber (41a) where the refrigerant is compressed and, concurrently, a new low-pressure chamber (41b) is formed on the other side of the blade (46). When in this state the cylinder (40) further moves orbitally, a suction of refrigerant is implemented in the new low-pressure chamber (41b) and, concurrently, the volume of the high-pressure chamber (41a) lessens to compress the refrigerant therein. Then, when the pressure in the high-pressure chamber (41a) exceeds the back pressure acting on the first valve element (18a), the first valve element (18a) deforms towards the valve stop (16) so that its distal end comes away from the surrounding region of the outlet of the outer discharge passage (51) which serves as a valve seat surface. Thus, high-pressure refrigerant obtained by compression in the outer cylinder chamber (41) is discharged through the outer discharge passage (51) into the discharge space (53). Note that the amount of deformation of the first valve element (18a) is limited by the valve stop (16).

In the inner cylinder chamber (42) during the course of the compressing work, when the cylinder (40) moves orbitally clockwise in the figure from the position shown in FIG. 5B (the position where the volume of the low-pressure chamber (42b) is substantially at its minimum), refrigerant is sucked through the suction passage (7) into the low-pressure chamber (42b). Concurrently, refrigerant is sucked from the suction space (6) through the through hole (44) into the low-pressure chamber (42b). Then, when the cylinder (40) further moves orbitally in order of FIGS. 5C, 5D and 5A and comes again to the position in FIG. 5B, a suction of refrigerant into the low-pressure chamber (42b) is completed.

At the completion of this suction of refrigerant, the low-pressure chamber (42b) becomes a high-pressure chamber (42a) where the refrigerant is compressed and, concurrently, a new low-pressure chamber (42b) is formed on the other side of the blade (46). When in this state the cylinder (40) further moves orbitally, a suction of refrigerant is implemented in the new low-pressure chamber (42b) and, concurrently, the volume of the high-pressure chamber (42a) lessens to compress the refrigerant therein. Then, when the pressure in the high-pressure chamber (42a) exceeds the back pressure acting on the second valve element (18b), the second valve element (18b) deforms towards the valve stop (16) so that its distal end comes away from the surrounding region of the outlet of the inner discharge passage (52) which serves as a valve seat surface. Thus, high-pressure refrigerant obtained by compression in the inner cylinder chamber (42) is discharged through the inner discharge passage (52) into the discharge space (53). Note that the amount of deformation of the second valve element (18b) is limited by the valve stop (16).

The refrigerant discharged into the discharge space (53) flows through the communication passage (57) into the space located above the compression mechanism (20), then flows through the clearance formed around the electric motor (30) and is then discharged through the discharge pipe (13) to the outside.

Effects of Embodiment 1

In Embodiment 1, in forming the bolt hole (26), the thick portion of the lower housing (37) overlapping the annular piston (45) as viewed in the thickness direction of the lower housing (37) is used to eliminate the need to provide a raised part for forming the bolt hole (26). Therefore, the labor of working the lower housing (37) can be reduced. Furthermore, where the bolt hole (26) is formed in the portion of the lower housing (37) overlapping the annular piston (45), the bolt hole (26) is not located in the vicinity of the peripheral edge of the lower housing (37). Therefore, the length of the discharge valve (21) is shortened as compared with the conventional technique in which the raised part is provided. This reduces the necessary rigidity of the discharge valve (21) and thereby reduces the thickness and width thereof. As a result, the discharge valve (21) can be downsized.

Furthermore, in Embodiment 1, the recess (25) is provided in the lower housing (37) in order to lessen the dead volume. In addition, the bolt hole (26) is formed in the portion of the lower housing (37) overlapping the annular piston (45). Therefore, the bolt hole (26) is closer to the discharge passages (51, 52) than according to the conventional technique in which the bolt hole (26) is formed in the raised part. Thus, the area of the recess (25) can be reduced as compared with the conventional technique. This reduces the deformation of the lower housing (37) produced in the process of refrigerant compression in the cylinder chamber (41, 42), which reduces leakage of refrigerant from the cylinder chamber (41, 42) accompanying the deformation of the lower housing (37) and in turn enhances the compression efficiency of the rotary compressor (10).

Furthermore, in Embodiment 1, the discharge passages (51, 52) are formed in the cross section of a slit extending in the longitudinal direction of the valve element to reduce the necessary width of the recess (25). Therefore, the area of the recess (25) can be further reduced.

Furthermore, since the annular piston (45) is joined to the back side of the bottom wall of the recess (25), the area of the thin portion of the bottom wall of the recess (25) can be reduced. In addition, since in Embodiment 1 the recess (25) is formed from radially inwardly to outwardly of the annular piston (45) and extends in a tangential direction of the annular piston (45), the area of the portion of the bottom wall of the recess (25) overlapping the annular piston (45) can be increased, which reduces the area of the thin portion of the bottom wall of the recess (25).

Therefore, the deformation of the lower housing (37) produced in the process of refrigerant compression in the cylinder chamber (41, 42) can be reduced. This reduces leakage of refrigerant from the cylinder chamber (41, 42) accompanying the deformation of the lower housing (37) and in turn, according to Embodiment 1, enhances the compression efficiency of the rotary compressor (10).

Furthermore, according to Embodiment 1, the bolt hole (26) is formed to reach the annular piston (45) by use of the inside of the annular piston (45). This ensures a sufficient length of screw engagement between the external thread of the fixing bolt (22) and the internal thread of the bolt hole (26), whereby the discharge valve (21) can be further firmly fixed to the lower housing (37).

Furthermore, in Embodiment 1, the discharge passages (51, 52) are each formed in the cross section of a slit extending in the longitudinal direction of the first valve element (18a) and the second valve element (18b) to reduce the necessary widths of these valve elements. Therefore, the discharge valve (21) can be downsized.

Furthermore, in Embodiment 1, the portion of the lower housing (37) overlapping the annular piston (45), which is the portion thereof where the bolt hole (26) is to be formed, has a large width. Therefore, the space for forming the bolt hole (26) can be easily secured. Furthermore, since the strength of the portion of the lower housing (37) surrounding the bolt hole (26) can be increased, this prevents breakage of that portion. Alternatively, the thickness of the fixing bolt (22) can be increased. In the latter case, the fixing bolt (22) can be prevented from breakage.

Modification of Embodiment 1

Figure 6:
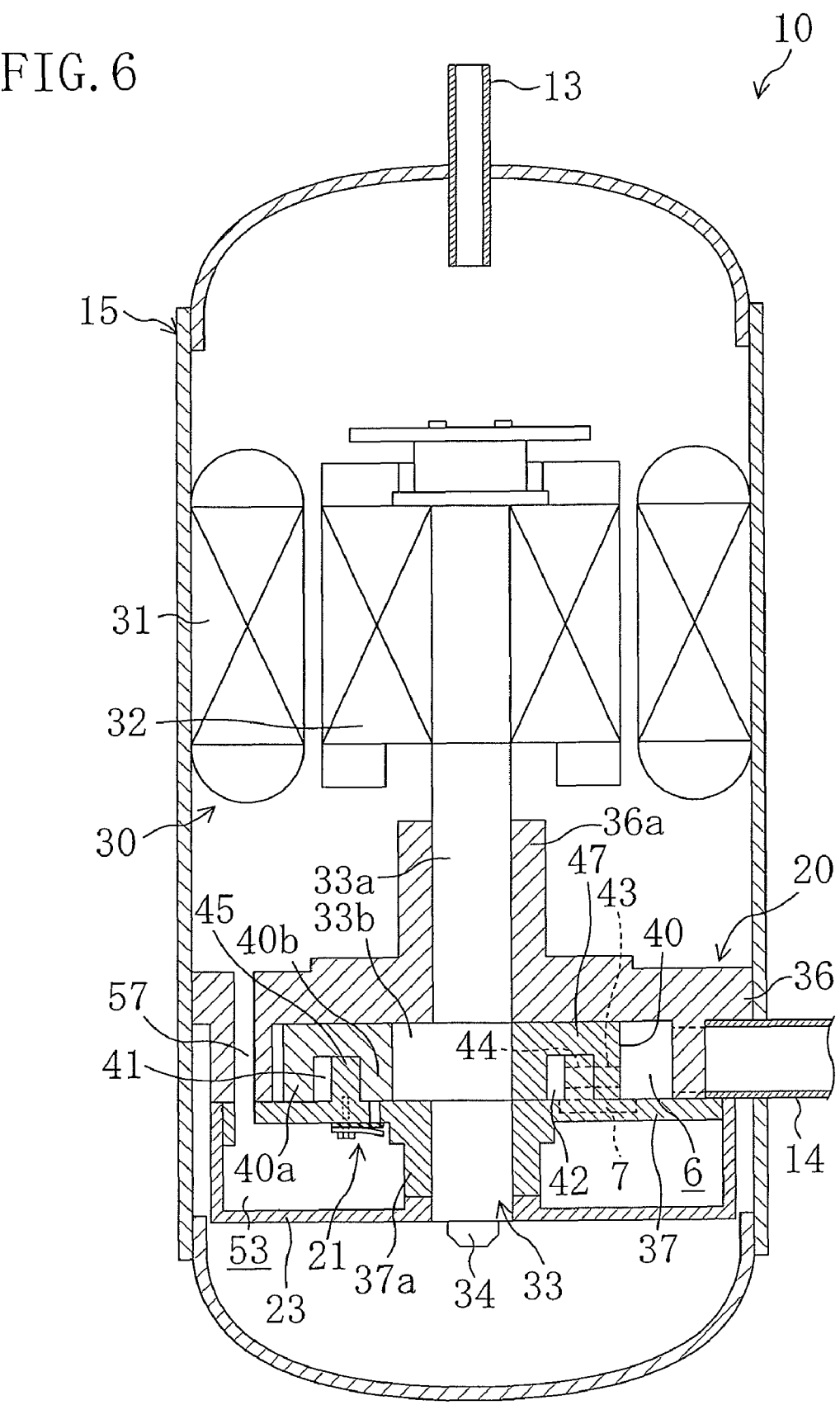
FIG. 6 is a longitudinal cross-sectional view of a rotary compressor according to a modification of Embodiment 1.

A description is given of a modification of Embodiment 1. In this modification, as shown in FIG. 6, the back face of the lower housing (37) is not formed with the recess (25) and the outer discharge passage (51), the inner discharge passage (52) and the bolt hole (26) open at the back face of the lower housing (37). The bolt hole (26) is formed, in a portion of the lower housing (37) overlapping the annular piston (45) as viewed in the thickness direction of the lower housing (37), to extend from the back face of the lower housing (37) to the annular piston (45).

Embodiment 2 of the Invention

Figure 7:
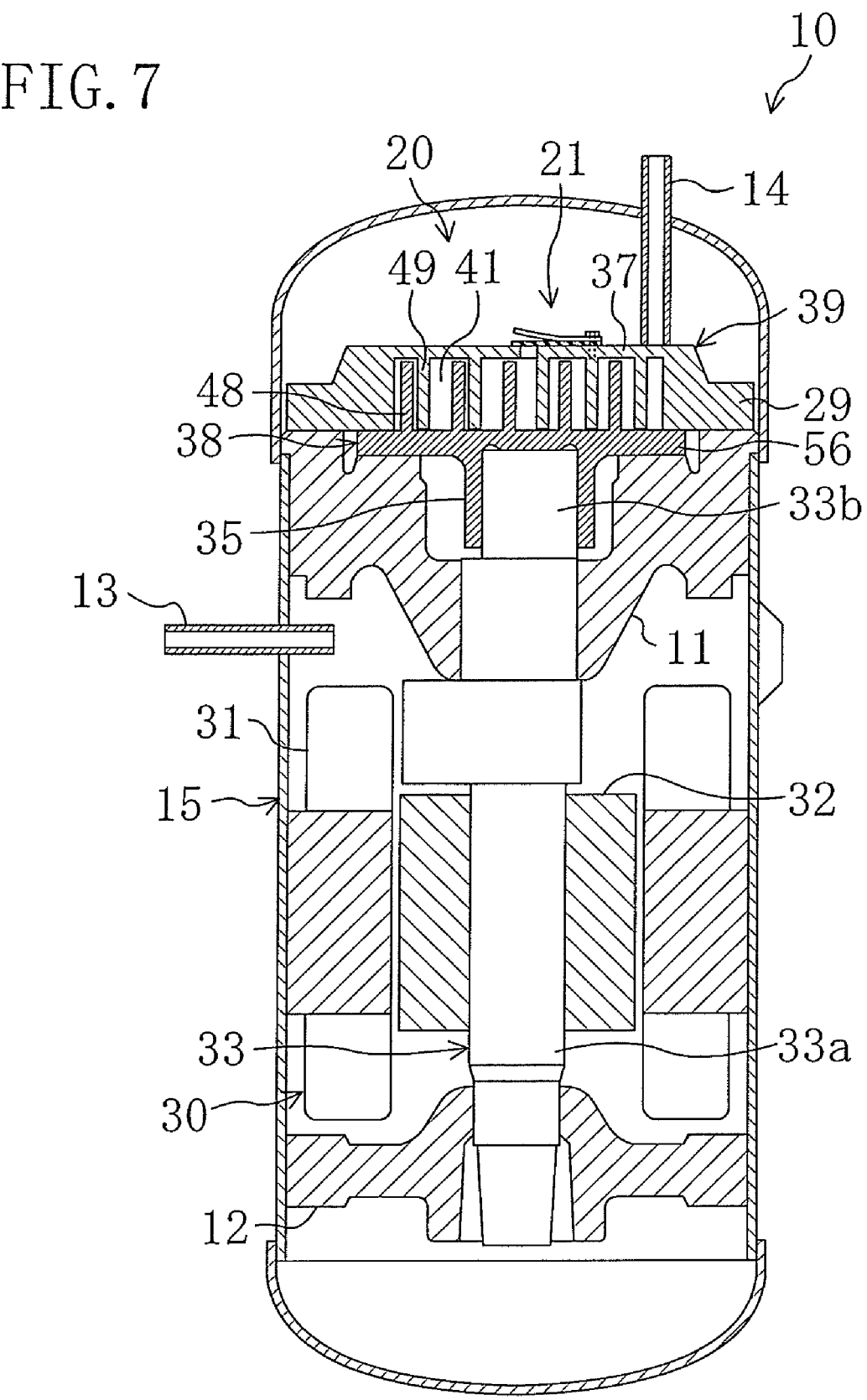
FIG. 7 is a longitudinal cross-sectional view of a rotary compressor according to Embodiment 2.

A description is given of Embodiment 2 of the invention. FIG. 7 shows a longitudinal cross-sectional view of a compressor (10) according to Embodiment 2. The compressor (10) is a scroll type rotary compressor (10) in which a later-described movable scroll (38) moves orbitally with respect to a later-described fixed scroll (39) to compress refrigerant in a compression chamber (41). The compressor (10) is disposed in a refrigerant circuit of a refrigeration system which is filled with carbon dioxide as the refrigerant and operates in a vapor compression refrigeration cycle.

The compressor (10) includes a casing (15) that is a vertically elongated, cylindrical, closed enclosure. The casing (15) contains a compression mechanism (20) disposed in an upper part thereof and an electric motor (30) disposed in a lower part thereof.

The casing (15) is provided with a suction pipe (14) passing through the top thereof. The suction pipe (14) is connected to the compression mechanism (20). The casing (15) is provided also with a discharge pipe (13) passing through the shell thereof. The discharge pipe (13) has an inlet opening into a space of the casing (15) located between the compression mechanism (20) and the electric motor (30).

The casing (15) is internally provided with a vertically extending crankshaft (33). The crankshaft (33) includes a main spindle (33a) and an eccentric part (33b). The main spindle (33a) has a top end formed to have a slightly larger diameter than the other part thereof. The eccentric part (33b) is formed in a columnar shape having a smaller diameter than the main spindle (33a) and provided on the top end of the main spindle (33a). The axis of the eccentric part (33b) is eccentric a specified distance away from the axis of the main spindle (33a).

Provided below the electric motor (30) is a lower bearing unit (12) fixed to the lower end of the shell of the casing (15). A sliding bearing is formed in the center of the lower bearing unit (12) and rotatably supports the lower end of the main spindle (33a).

The electric motor (30) includes a stator (31) and a rotor (32). The stator (31) is fixed to the interior wall of the shell of the casing (15). The rotor (32) is placed inside the stator (31) and connected to the main spindle (33a) of the crankshaft (33). The crankshaft (33) is configured to rotate together with the rotor (32).

The compression mechanism (20) includes the movable scroll (38) serving as a movable member performing eccentric motion, the fixed scroll (39) serving as a fixed member defining a later-described compression chamber (41, 42) together with the movable scroll (38), and a housing (11). The housing (11) is formed in the shape of a relatively thick disk having a depressed central part and joined at its peripheral edge to the upper end of the shell of the casing (15). The main spindle (33a) of the crankshaft (33) is inserted in the center of the housing (11). The housing (11) constitutes a bearing rotatably supporting the main spindle (33a) of the crankshaft (33).

The movable scroll (38) includes a disk-like end plate (56), a movable wrap (48) in the shape of a spiral wall standing on the front face (top face) of the end plate (56), and a cylindrical extension (35) extending from the back face (bottom face) of the end plate (56). The movable scroll (38) is put through an unshown Oldham ring on the top face of the housing (51). Furthermore, the extension (35) of the movable scroll (38)

receives the eccentric part (33b) of the crankshaft (33). In other words, the movable scroll (38) is engaged on the crankshaft (33).

The fixed scroll (39) includes a disk-like end plate (37), a fixed wrap (49) in the shape of a spiral wall standing on the front face (bottom face) of the end plate (37), and a relatively thick peripheral part (29) formed continuously outwardly from the periphery of the end plate (37).

Figure 8:
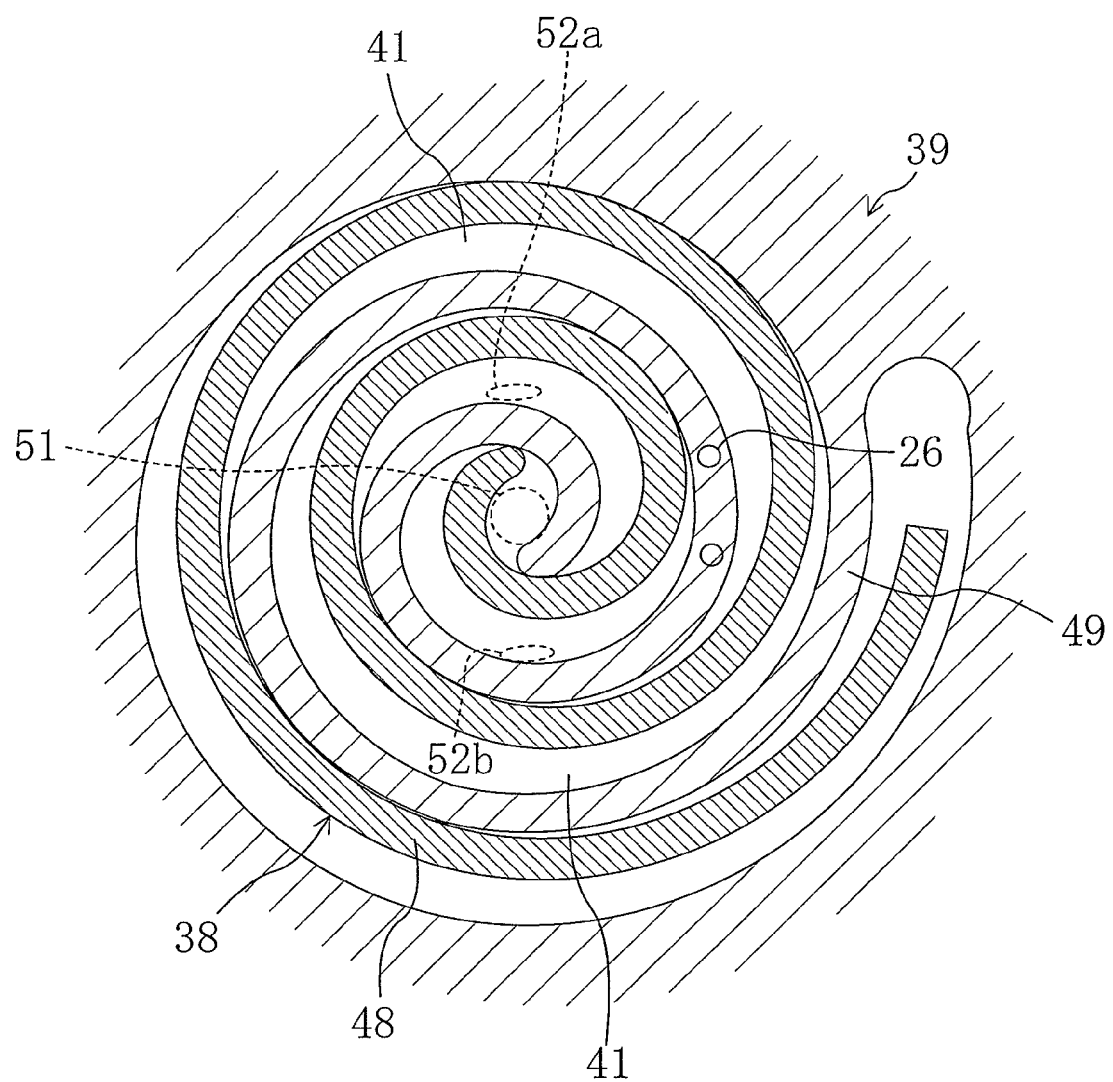
FIG. 8 is a transverse cross-sectional view of a compression mechanism in the rotary compressor according to Embodiment 2.

As shown in FIG. 8, in the compression mechanism (20), the fixed wrap (49) of the fixed scroll (39) is engaged with the movable wrap (48) of the movable scroll (38). The engagement between the fixed wrap (49) and the movable wrap (48) forms a compression chamber (41) composed of a plurality of sections.

Figure 10:
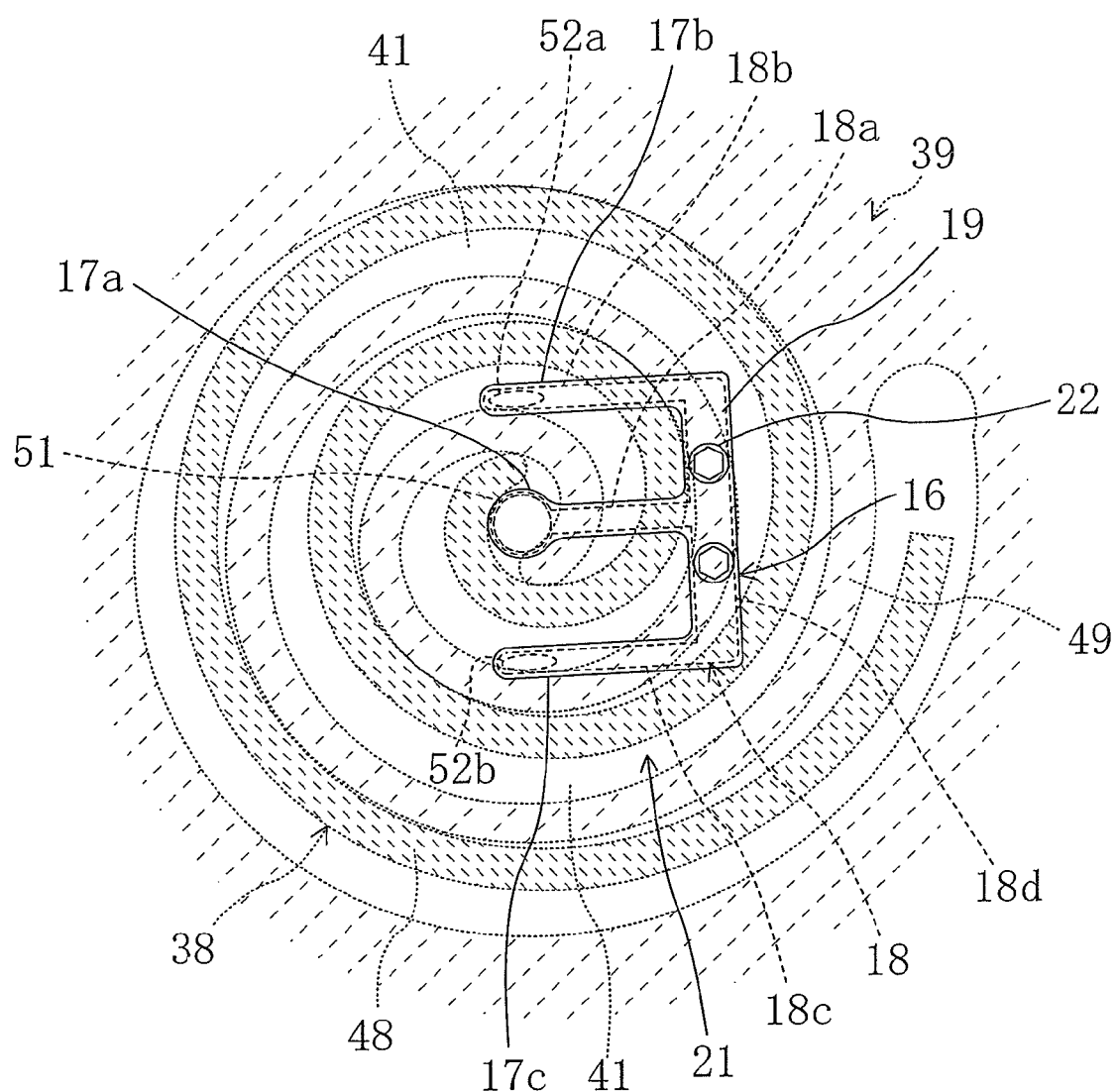
FIG. 10 is a plan view of an end plate in the rotary compressor according to Embodiment 2.

The end plate (37) is formed with a single main passage (51) and two bypass passages (52a, 52b) all of which serve as discharge passages communicated with associated sections of the compression chamber (41). The main passage (51) and the two bypass passages (52a, 52b) open at the back face of the end plate (37). The main passage (51) is disposed in the vicinity of the center of the end plate (37) and its inlet opens into the section of the compression chamber (41) formed at the innermost of the compression mechanism (20). The two bypass passages (52a, 52b) are disposed to locate the main passage (51) between them. The bypass passages (52a, 52b) are formed in the cross section of a laterally extending slit in FIG. 10 and its cross section is smaller than that of the main passage (51). The inlets of the bypass passages (52a, 52b) open slightly outwardly of the inlet of the main passage (51).

In Embodiment 2, the end plate (37) is formed to have a relatively small thickness. According to scroll type rotary compressors, even if the end plate (37) deforms in the process of refrigerant compression in the compression chamber (41), refrigerant leaking from a section of the compression chamber (41) moves to another adjacent section of the compression chamber (41) separated from the former section by the fixed wrap (49) or the movable wrap (48). In other words, even if the end plate (37) deforms, it does not occur that refrigerant leaking from the compression chamber (41) moves to the low-pressure side. Therefore, in scroll type rotary compressors, the drop in compression efficiency due to refrigerant leakage accompanying the deformation of the end plate (37) is relatively small.

Provided on the end plate (37) are a first valve element (18a), a second valve element (18b) and a third valve element (18c). The first valve element (18a), the second valve element (18b) and the third valve element (18c) are joined by a connecting part (18d). The first valve element (18a) has the shape of an elongated plate and its distal end has a circular shape slightly larger than the outlet of the main passage (51). The second valve element (18b) and the third valve element (18c) each have the shape of an elongated plate and their widths are slightly longer than the short axes of the outlet openings of the bypass passages (52). These valve elements (18a, 18b, 18c) are arranged so that their longitudinal directions coincide with the longitudinal direction of the bypass passages (52) and their front faces abut on the back face of the end plate (37). The first valve element (18a) is placed so that its front face abuts at its distal end on a portion of the end plate (37) surrounding the outlet of the main passage (51) and providing a valve seat surface for it. The second valve element (18b) and the third valve element (18c) are placed so that their front faces abut at their distal ends on portions of the end plate (37) surrounding the associated outlets of the bypass passages (52a, 52b) and providing valve seat surfaces for them.

The end plate (37) is further provided with a plate-shaped valve stop (16) composed of a fixed part (19), a first main part (17a), a second main part (17b) and a third main part (17c). The valve stop (16) is formed so that the three main parts (17a, 17b, 17c) extend in the same direction from one side of the fixed part (19) in spaced relation to each other, and has the shape of an E in plan view. The valve stop (16) and the valve element (18) constitute a discharge valve (21) of the invention. The discharge valve (21) is a reed valve and is configured so that the valve element (18) elastically deforms to open or close the discharge passages (51, 52).

The valve stop (16) is placed so that the first main part (17a) overlies the first valve element (18a), the second main part (17b) overlies the second valve element (18b) and the third main part (17c) overlies the third valve element (18c). The fixed part (19) of the valve stop (16) abuts on the back faces of the root ends of all the valve elements (18a, 18b, 18c). The main parts (17a, 17b, 17c) each have an upwardly bowed arcuate shape so that their top faces come farther away from the associated valve elements (18a, 18b, 18c) with approach towards their distal ends. The first main part (17a) limits the amount of deformation of the first valve element (18a), the second main part (17b) limits the amount of deformation of the second valve element (18b) and the third main part (17c) limits the amount of deformation of the third valve element (18c).

Figure 9:
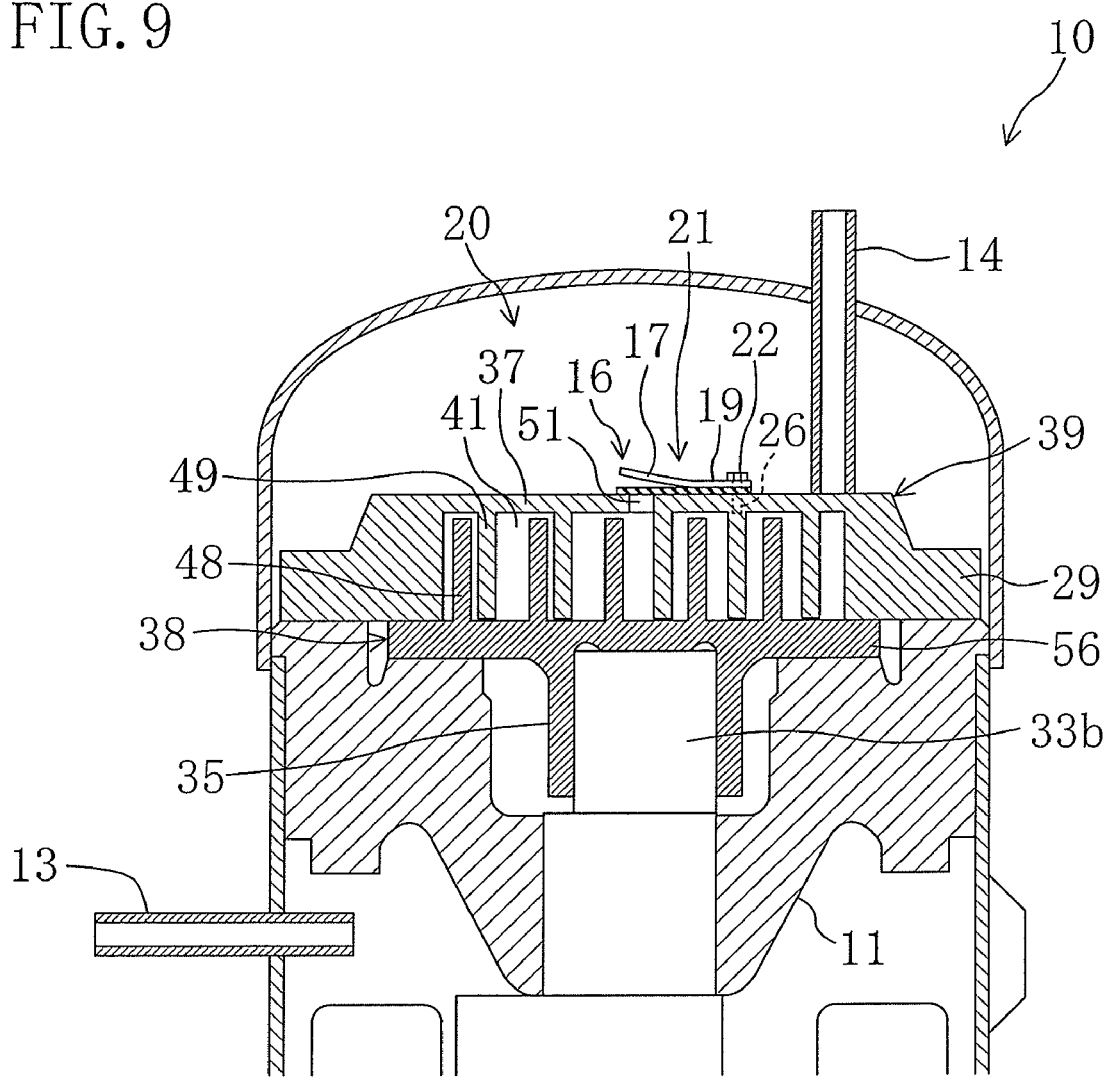
FIG. 9 is an enlarged cross-sectional view of an upper part of the rotary compressor according to Embodiment 2.

Two bolt holes (26) are formed, in a portion of the end plate (37) overlapping the fixed wrap (49) as viewed in the thickness direction of the end plate (37), to extend from the back face of the end plate (37) to the fixed wrap (49). The bolt holes (26), as shown in FIG. 9, pass through the end plate (37) and reaches the fixed wrap (49) joined to the other side of the end plate (37). The bolt holes (26, 26) are formed, one at a point between the root end of the first valve element (18a) and the root end of the second valve element (18b) and the other at a point between the root end of the first valve element (18a) and the root end of the third valve element (18c). Furthermore, the connecting part (18d) and the fixed part (19) of the valve stop (16) are each formed with two through holes. Two fixing bolts (22) serving as fastening elements are inserted into the through holes and screwed in the associated bolt holes (26). Thus, the valve element (18) and the valve stop (16) are mounted to the recess (25). The root ends of the valve elements (18a, 18b, 18c) are gripped between the fixed part (19) and the bottom of the recess (25).

Operational Behavior

Next, a description is given of the operational behavior of the scroll type rotary compressor (10).

When the electric motor (30) is started up, the rotation of the rotor (32) is transmitted through the crankshaft (33) to the movable scroll (38) of the compression mechanism (20). The movable scroll (38) engaged with the eccentric part (33b) of the crankshaft (33) is guided by the Oldham ring to move orbitally without rotating on its axis.

When the movable scroll (38) moves orbitally, low-pressure gas refrigerant flows through the suction pipe (14) into the section of the compression chamber (41) located on the outermost peripheral sides of the movable wrap (48) and the fixed wrap (49). When the movable scroll (38) further moves orbitally, the gas refrigerant confined in that section of the compression chamber (41) gradually moves towards the innermost of the compression mechanism (20), so that the sections of the compression chamber (41) for the gas refrigerant accordingly have decreasing volumes to gradually compress the gas refrigerant. Then, when the compressed gas refrigerant is led to the innermost of the compression mechanism (20) at which the inlet of the main passage (51) opens and the pressure of the gas refrigerant exceeds the back pressure acting on the first valve element (18a), the first valve element (18a) deforms towards the valve stop (16). Thus, the first valve element (18a) comes away from the surrounding region of the outlet of the main passage (51) which serves as a valve seat surface, whereby high-pressure gas refrigerant obtained by the compression is discharged through the main passage (51) into the space located above the compression mechanism (20).

The pressure ratio between the discharge-side refrigerant and the suction-side refrigerant may dip from the compression ratio determined by the shapes of the fixed wrap (49) and the movable wrap (48). If in this case the gas refrigerant in the compression chamber (41) is fully compressed and then discharged through the main passage (51), it will be excessively compressed to waste the power for use in driving the compression mechanism (20). To cope with this, the rotary compressor (10) is provided with the bypass passages (52a, 52b). Therefore, when the internal pressure of the compression chamber (41) exceeds the pressure of the discharge-side refrigerant in the course of movement of gas refrigerant confined in the compression chamber (41) towards the innermost of the compression mechanism (20), the second valve element (18b) or the third valve element (18c) deforms towards the valve stop (16). Thus, the bypass passage (52a, 52b) opens and the gas refrigerant is discharged through the bypass passage (52a, 52b).

The refrigerant discharged from the compression mechanism (20) flows through an unshown passage and then into the space located below the compression mechanism (20) and is then discharged through the discharge pipe (13) to the outside of the casing (15).

Effects of Embodiment 2

In Embodiment 2, in forming the bolt holes (26), the thick portion of the end plate (37) overlapping the fixed wrap (49) as viewed in the thickness direction of the end plate (37) is used to eliminate the need to provide raised parts for forming the bolt holes (26). Therefore, the labor of working the end plate (37) can be reduced. Furthermore, where the bolt holes (26) are formed in the portion of the end plate (37) overlapping the fixed wrap (49), the bolt holes (26) are not located in the vicinity of the peripheral edge of the end plate (37). Therefore, the length of the discharge valve (21) is shortened as compared with the conventional technique in which the raised parts are provided. This reduces the necessary rigidity of the discharge valve (21) and thereby reduces the thickness and width thereof. As a result, the discharge valve (21) can be downsized.

Modification 1 of Embodiment 2

Figure 11:
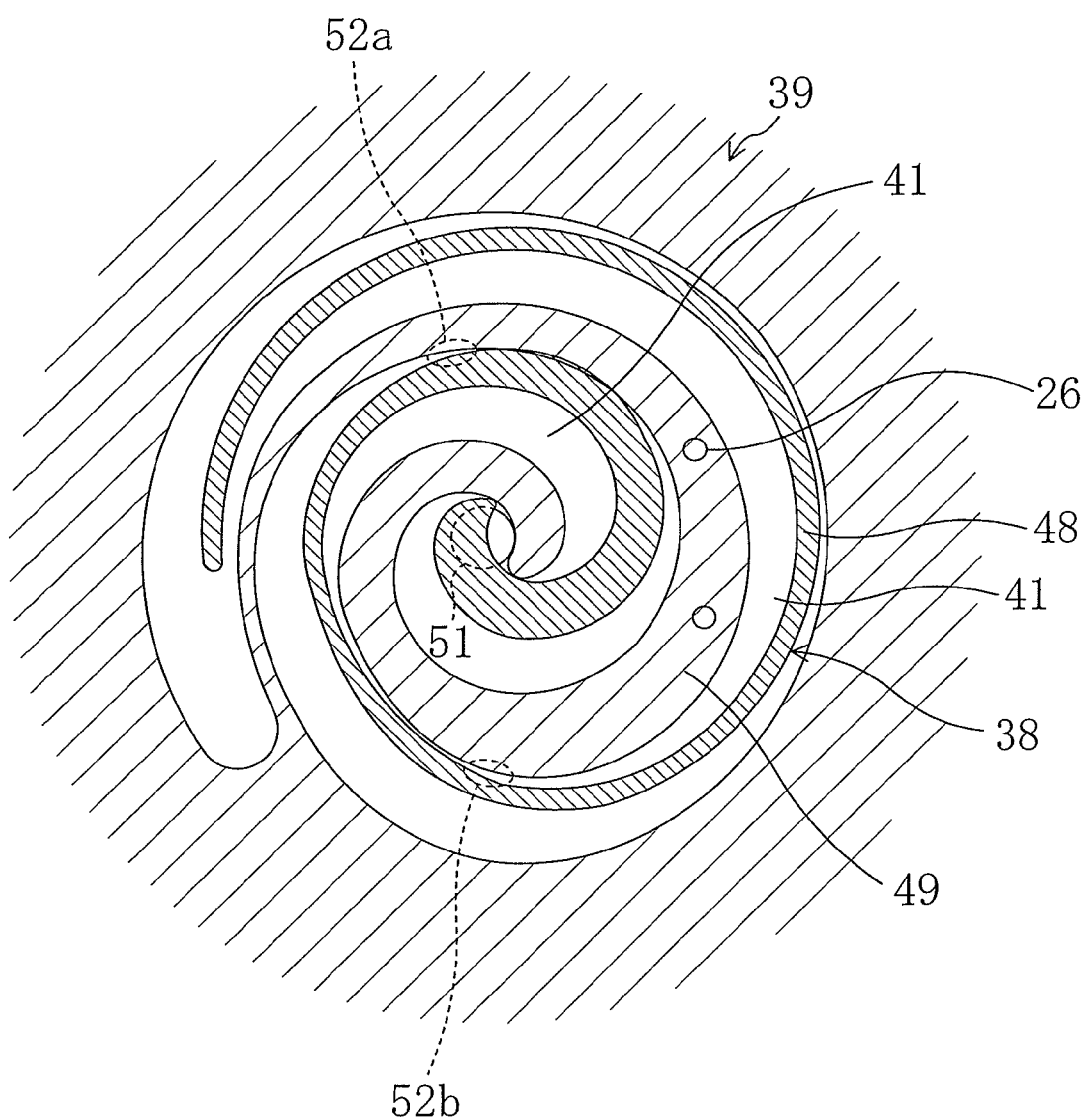
FIG. 11 is a transverse cross-sectional view of a compression mechanism in a rotary compressor according to Modification 1 of Embodiment 2.

A description is given of Modification 1 of Embodiment 2. Modification 1 is different from Embodiment 2 in the shapes of the movable wrap (48) and the fixed wrap (49). FIG. 11 shows a transversal cross-sectional view of a compression mechanism according to Modification 1.

The movable wrap (48) gradually changes its thickness so that its inner part has larger thickness. The fixed wrap (49) also gradually changes its thickness but is formed to generally have a larger thickness than the movable wrap (48). A portion of the fixed wrap (49) where bolt holes (26) are formed has a large thickness.

According to this modification, since the portion of the fixed wrap (49) where bolt holes (26) are formed has a large thickness, the strength of the portions of the fixed wrap (49) surrounding the bolt holes (26) can be increased, which prevents breakage of those parts.

Modification 2 of Embodiment 2

Figure 12:
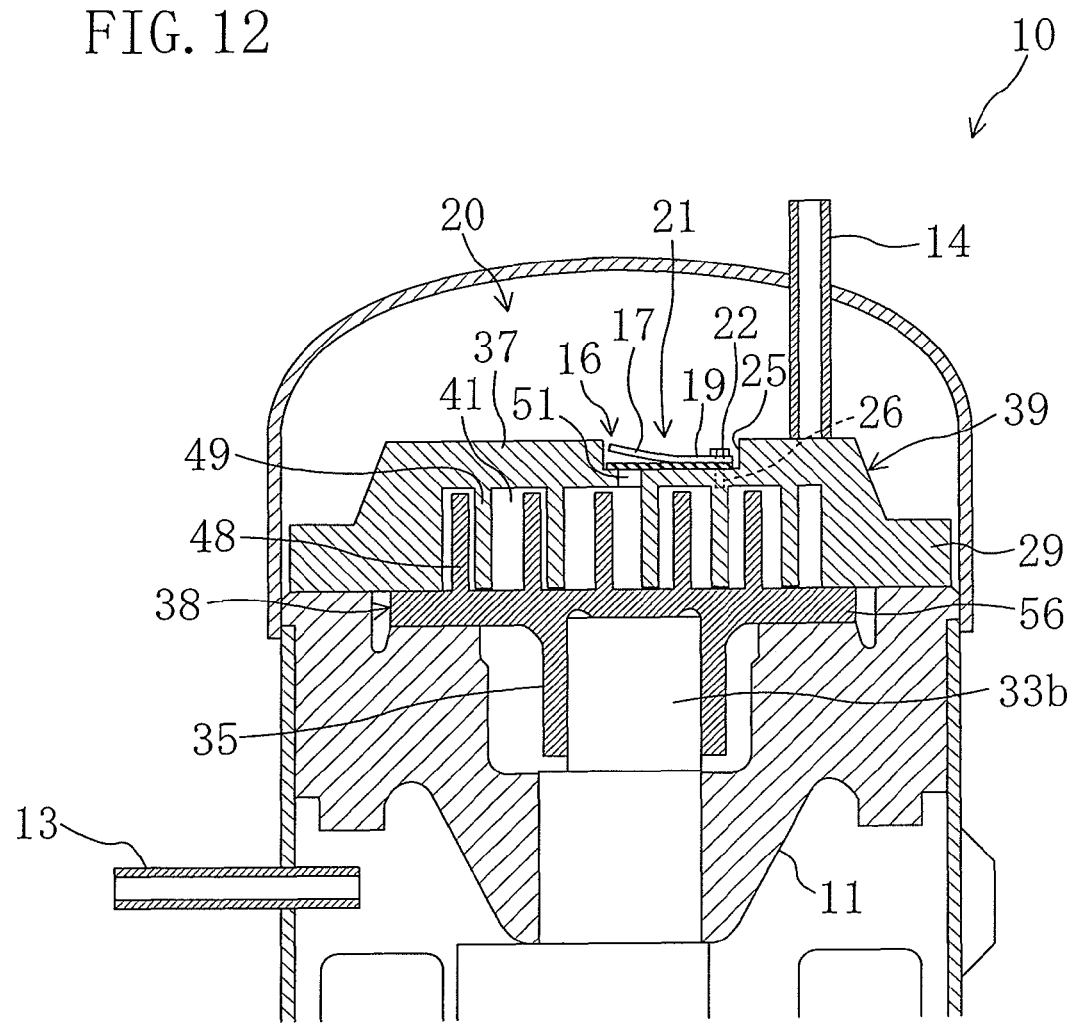
FIG. 12 is an enlarged longitudinal cross-sectional view of an upper part of a rotary compressor according to Modification 2 of Embodiment 2.

A description is given of Modification 2 of Embodiment 2. In Modification 2, as shown in FIG. 12, a recess (25) is formed in the back face of the end plate (37). The end plate (37) is formed in a rectangular shape in plan view and has a main passage (51), bypass passages (52a, 52b) and bolt holes (26) opening at the bottom of the recess (25). Furthermore, the end plate (37) is provided with a discharge valve (21) composed of a valve element (18) and a valve stop (16).

Other Embodiments

The above embodiments may have the following structures.

Figure 13:
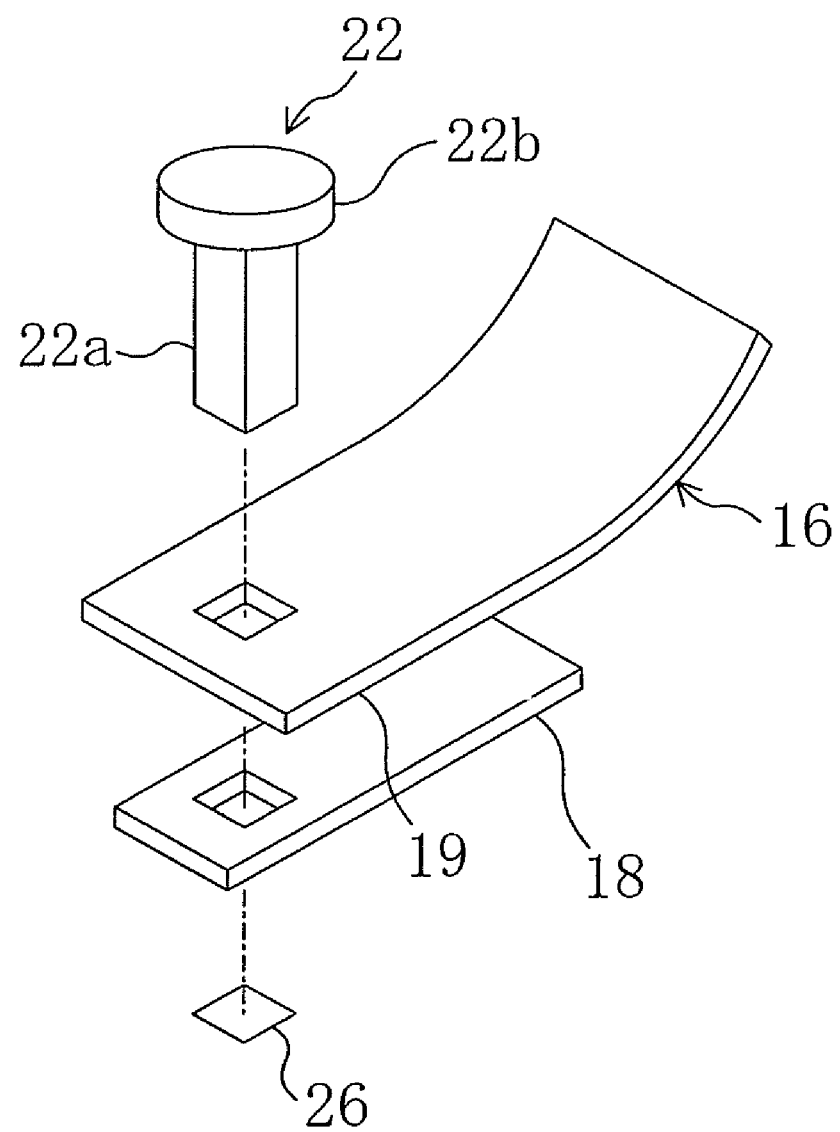
FIG. 13 is a perspective view of a fastening element and a fitting hole according to another embodiment of the invention.

The fitting hole (26) may be a rectangular hole (see FIG. 13). Used as the fastening element (22) in this case is a pin-like member in which a rectangular fitting part (22a) conforming to the fitting hole (26) extends from its head (22b). In mounting the valve stop (16) to the end plate (37), the head (22b) of the fastening element (22) is pushed so that the fitting part (22a) is inserted into the fitting hole (26). Alternatively, the fitting hole (26) may be an elongated slot. In this case, the fitting part (22b) of the fastening element (22) is in the shape of a plate.

Figure 14A:
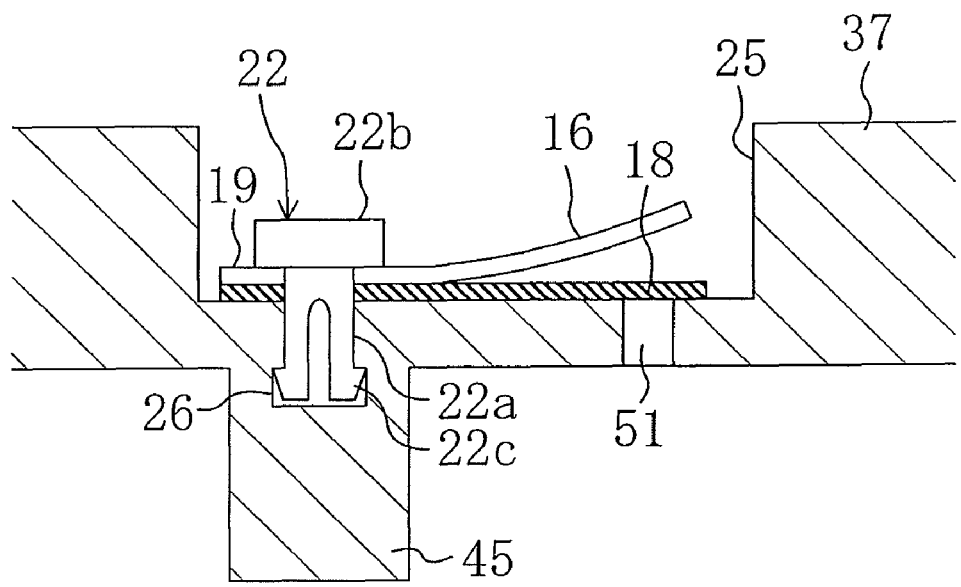
FIGS. 14A and 14B show cross-sectional views of discharge valves according to other different embodiments of the invention.
Figure 14B:
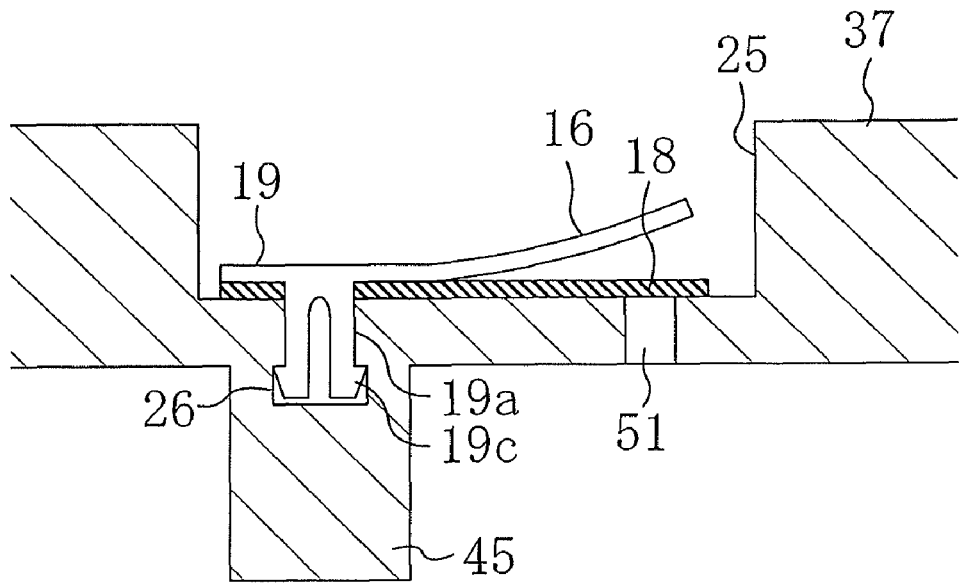

The fastening element (22) may have a fitting part (22a) whose distal end is bifurcated and the bifurcations at the distal end may be formed with their respective engagement parts (22c) (see FIG. 14). The wall surface of the fitting hole (26) has a step so that the bottom thereof has a larger diameter. Upon insertion of the fastening element (22) into the fitting hole (26), the bifurcated fitting part (22a) bends inward. The fastening element (22) can be held against disengagement from the end plate (37) by snapping the engagement parts (22a) on the step.

Alternatively, instead of use of the fastening element (22), the fixed part (19) of the valve stop (16) may be provided with a fitting part (19a). The valve stop (16) can be mounted to the end plate (37) simply by inserting the fitting part (19a) into the fitting hole (26). In this case, as shown in FIG. 14, the distal end of the fitting part (19a) may be bifurcated and the bifurcations may be provided with their respective engagement parts (19c).

Furthermore, the rotary compressor (10) may be disposed in any refrigerant circuits using refrigerants other than carbon dioxide.

Note that the above embodiments are merely preferred examples in nature and are not intended to limit the scope, applications and use of the invention.

INDUSTRIAL APPLICABILITY

As seen from the above description, the invention is useful for rotary compressors in which a fluid is compressed in a compression chamber defined by a movable member and a fixed member.

What is claimed is:
1. A rotary compressor comprising:
a cylinder having an annular cylinder chamber;
an annular piston disposed in the cylinder chamber eccentrically with respect to the cylinder to divide the cylinder chamber into an outer cylinder chamber and an inner cylinder chamber, the rotary compressor being configured to compress a fluid in the cylinder chamber by moving the cylinder and the annular piston eccentrically relative to each other;

a blade disposed in the cylinder chamber to divide each of the outer and inner cylinder chambers into a first chamber and a second chamber; and an end plate having a front face attached to a root end of the annular piston and facing the cylinder chamber the end plate having a discharge passage and a discharge valve configured to open and close the discharge passage, the discharge passage being in fluid communication with the cylinder chamber and being open at a back face of the end plate, the discharge valve being fixed to the end plate by a fastening element, and the end plate further having a fitting hole that receives the fastening element, the fitting hole being aligned with the annular piston as viewed along a longitudinal axis of the fitting hole, and the fitting hole opening at the back face of the end plate.

2. The rotary compressor of claim 1, wherein
the end plate has a recess formed in the back face thereof, and the discharge passage and the fitting hole open at a bottom surface of the recess.

3. The rotary compressor of claim 2, wherein
the recess extends from radially inwardly to outwardly of the annular piston as viewed in the thickness direction of the end plate and extends along a tangential direction of the annular piston.

4. The rotary compressor of claim 3, wherein
the fitting hole extends through the end plate into the annular piston.

5. The rotary compressor of claim 2, wherein
the fitting hole extends through the end plate into the annular piston.

6. The rotary compressor of claim 1, wherein
the fitting hole extends through the end plate into the annular piston.

7. The rotary compressor of claim 1, wherein
the discharge valve is formed of a reed valve including a plate-shaped valve element abutting the back face of the end plate and a valve stop configured to limit an amount of deformation of the valve element, and the fastening element passes through a root end of the valve stop.

8. The rotary compressor of claim 7, wherein
the discharge passage is elongated in a longitudinal direction of the valve element.

\* \* \* \* \*